(12) United States Patent
Ghannam et al.

(10) Patent No.: US 10,597,089 B2
(45) Date of Patent: Mar. 24, 2020

(54) METHOD AND APPARATUS FOR MOUNTING AN ENCLOSURE FOR ELECTRICAL DEVICES ON THE ROOF OF AN AUTONOMOUS VEHICLE

(71) Applicant: Ford Global Technologies, LLC, Dearborn, MI (US)

(72) Inventors: Mahmoud Yousef Ghannam, Canton, MI (US); Saied Nusier, Canton, MI (US); Mohamed Ridha Baccouche, Ann Arbor, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 41 days.

(21) Appl. No.: 15/951,847

(22) Filed: Apr. 12, 2018

(65) Prior Publication Data

US 2019/0315409 A1 Oct. 17, 2019

(51) Int. Cl.
*B62D 25/06* (2006.01)
*G01S 13/93* (2020.01)
(Continued)

(52) U.S. Cl.
CPC ............ *B62D 25/06* (2013.01); *B62D 25/04* (2013.01); *B62D 65/02* (2013.01); *G01S 2013/9382* (2013.01)

(58) Field of Classification Search
CPC ............ B62D 25/06; B60R 2011/0028; G01S 2013/9382; G05D 1/0257; G05D 1/0231
(Continued)

(56) References Cited

U.S. PATENT DOCUMENTS 3,858,774 A * 1/1975 Friis ............... B60R 11/00
224/325
5,306,156 A * 4/1994 Gibbs ............. B60Q 1/302
224/315
(Continued)

FOREIGN PATENT DOCUMENTS

| CN | 206067648 U | 4/2017 |
|---|---|---|
| CN | 106945612 A | 7/2017 |
| GB | 2474857 A | 5/2011 |

OTHER PUBLICATIONS

Website: www://spectrum.ieee.org/automaton/robotics/artificial-intelligence/googles-autonomous-car-takes-to-the-streets, Evan Ackerman, Google's Autonomous Car Takes to the Streets, NY Times Webpage, 2 pages, Oct. 13, 2010, US, Retrieved from the internet on Jan. 8, 2018.

*Primary Examiner* — Gregory A Blankenship
(74) *Attorney, Agent, or Firm* — Vichit Chea; Brooks Kushman P.C.

(57) ABSTRACT

An autonomous vehicle is equipped an enclosure for electronic devices that is attached to a roof. First and second bridge brackets extend between the enclosure and one of the roof rails on opposite sides of the roof. The vehicle also includes a roof support structure including a roof bow and windshield header that also supports the enclosure for electronic devices. A method of providing the enclosure for electronic components on the roof of an autonomous vehicle includes the step of inserting first and second bridge brackets into an injection molding die. A thermoplastic material is injected into the injection molding die to form the hollow enclosure and bridge bracket sub-assembly. The sub-assembly is then arranged on the roof, and the bridge brackets are attached to roof rails of the vehicle.

16 Claims, 4 Drawing Sheets

(51) Int. Cl.
  *B62D 25/04* (2006.01)
  *B62D 65/02* (2006.01)
(58) Field of Classification Search
  USPC .......................................... 296/210; 224/309
  See application file for complete search history.

(56) References Cited

U.S. PATENT DOCUMENTS

| | | | | |
|---|---|---|---|---|
| 5,681,076 | A * | 10/1997 | Yoshii | B62D 25/06 296/210 |
| 8,215,708 | B2 * | 7/2012 | Gruneklee | B62D 25/06 296/187.12 |
| 8,534,516 | B1 | 9/2013 | Vo | |
| 8,622,266 | B2 | 1/2014 | McMillan | |
| 9,045,168 | B2 * | 6/2015 | Wagner | B62D 25/06 |
| 9,802,656 | B1 * | 10/2017 | Williams | G01S 13/89 |
| 10,099,630 | B1 * | 10/2018 | Krishnan | B60Q 1/503 |
| 10,302,744 | B1 * | 5/2019 | Krishnan | G01S 7/4813 |
| 2006/0102413 | A1 * | 5/2006 | Ootani | B60R 21/0136 180/274 |
| 2006/0274485 | A1 * | 12/2006 | Godoy | G01D 5/12 361/622 |
| 2007/0195939 | A1 * | 8/2007 | Sink | B60Q 1/2611 379/37 |
| 2008/0129025 | A1 * | 6/2008 | Ratajski | B60R 21/13 280/735 |
| 2016/0297482 | A1 * | 10/2016 | Sakabe | B62D 25/06 |
| 2017/0190300 | A1 * | 7/2017 | Maranville | B60R 9/04 |
| 2017/0305242 | A1 * | 10/2017 | Gallagher | B60J 7/043 |
| 2018/0015866 | A1 * | 1/2018 | Flaherty | B60P 3/1008 |
| 2018/0037267 | A1 * | 2/2018 | Williams | B62D 25/06 |
| 2018/0086280 | A1 * | 3/2018 | Nguyen | G01S 17/87 |
| 2018/0265019 | A1 * | 9/2018 | Dry | B60J 10/00 |
| 2019/0003895 | A1 * | 1/2019 | Krishnan | G01S 13/931 |
| 2019/0106156 | A1 * | 4/2019 | Piper | B62D 25/06 |
| 2019/0176717 | A1 * | 6/2019 | Gomes | B60R 11/04 |
| 2019/0202371 | A1 * | 7/2019 | Frederick | B60R 11/04 |

* cited by examiner

US 10,597,089 B2

METHOD AND APPARATUS FOR MOUNTING AN ENCLOSURE FOR ELECTRICAL DEVICES ON THE ROOF OF AN AUTONOMOUS VEHICLE

TECHNICAL FIELD

This disclosure relates to a method and apparatus for providing a rooftop enclosure for electronic equipment for an autonomous vehicle.

BACKGROUND

Autonomous vehicles in development use a wide variety of electronic equipment to sense or detect objects in the area around the vehicle to control the speed and direction of the autonomous vehicle. Some systems are more effective if they are not located inside the body of the vehicle but are instead assembled to the roof of the vehicle. The electronic equipment that benefit from an elevated and unobstructed mounting location on the roof of the vehicle may include lidar systems, radar systems, proximity sensors and cameras.

Vehicle roof structures are designed to resist penetration into the passenger compartment in the event of a collision that causes the vehicle to roll over. Vehicles are tested in a test known as Federal Motor Vehicle Safety Standard (FMVSS) 216 for roof crush resistance. In FMVSS 216(c) vehicle roofs are tested by applying a load to the roof rail area of the vehicle. The displacement of the roof is measured on each of the driver's side and passenger's side. There must be less than five inches of platen travel and there must be no contact with a head form disposed inside the vehicle. This test is representative of the strength and durability of a vehicle roof in a roll over condition.

Attaching an enclosure for electronic devices used by autonomous vehicles adversely affects FMVSS 216 tests because the roof crush loading plate pushes the enclosure against the roof and causes the enclosure to penetrate the passenger compartment roof into the occupant space. In some designs the roof headliner may be caused to make contact with the head form that is prohibited by National Highway Traffic Safety Administration regulations.

Adding additional roof support bows to strengthen the roof to support an enclosure for autonomous vehicle electronic devices adversely affects the goal of reducing vehicle weight to improve fuel economy.

This disclosure is directed to solving the above problems relating to providing a removable roof rack on a vehicle having a roof formed by a plurality of rigid removable roof panels as summarized below.

SUMMARY

According to one aspect of this disclosure, an autonomous vehicle is disclosed that is equipped with electronic devices that are attached to a roof. The vehicle includes a support structure including a roof bow for supporting the roof; and an enclosure for the electronic devices assembled onto the roof and partially supported by the support structure. First and second bridge brackets extend between a shoulder surface of the enclosure and one of the roof rails on opposite sides of the roof.

According to another aspect of this disclosure, an electronic equipment enclosure assembly is disclosed for an autonomous vehicle having a support structure and a roof attached to the support structure. The assembly comprises an enclosure for the electronic devices assembled onto the roof and partially supported by the support structure. First and second bridge brackets each extend between a shoulder surface of the enclosure, wherein the support structure includes a roof bow extending between right and left roof rails and one of the roof rails on opposite sides of the roof.

According to additional alternative aspects of this disclosure, the first and second bridge brackets may be attached to the roof and roof rails as a sub-assembly with the first and second bridge brackets being attached to the roof rails.

The enclosure and the first and second bridge brackets may be oriented to form an arch over the roof surface forward of the roof bow, wherein the roof bow extends between a first and second B-pillar.

The roof may define first and second edge cutouts, wherein the first and second bridge brackets may extend through the edge cutouts to be attached to the roof rails.

The first and second bridge brackets may be secured by fasteners to the roof rails or may be welded to the roof rails.

First and second cover pieces may be attached to the edge cutouts to seal against the roof about the first and second bridge brackets.

The first and second bridge brackets are formed of ultra-high strength steel, and the pod may be formed of nylon or a molded plastic material.

The enclosure and the first and second bridge brackets may be assembled together in an insert mold forming process and may be attached to the roof and roof rails as a sub-assembly with the first and second bridge brackets being attached to the roof rails.

According to another aspect of this disclosure a method is disclosed for providing an enclosure for electronic components on the roof of an autonomous vehicle. The method includes the step of inserting first and second bridge brackets into an injection molding die and injecting a thermoplastic material into the injection molding die to form the hollow enclosure thereby attaching the first and second bridge brackets to the enclosure. The enclosure is then arranged on the roof, and the bridge brackets are then attached to first and second roof rails.

The method may further comprise providing cover caps, forming edge cutouts in the roof, and assembling the cover caps into the cutouts to cover first and second distal ends of the bridging brackets.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
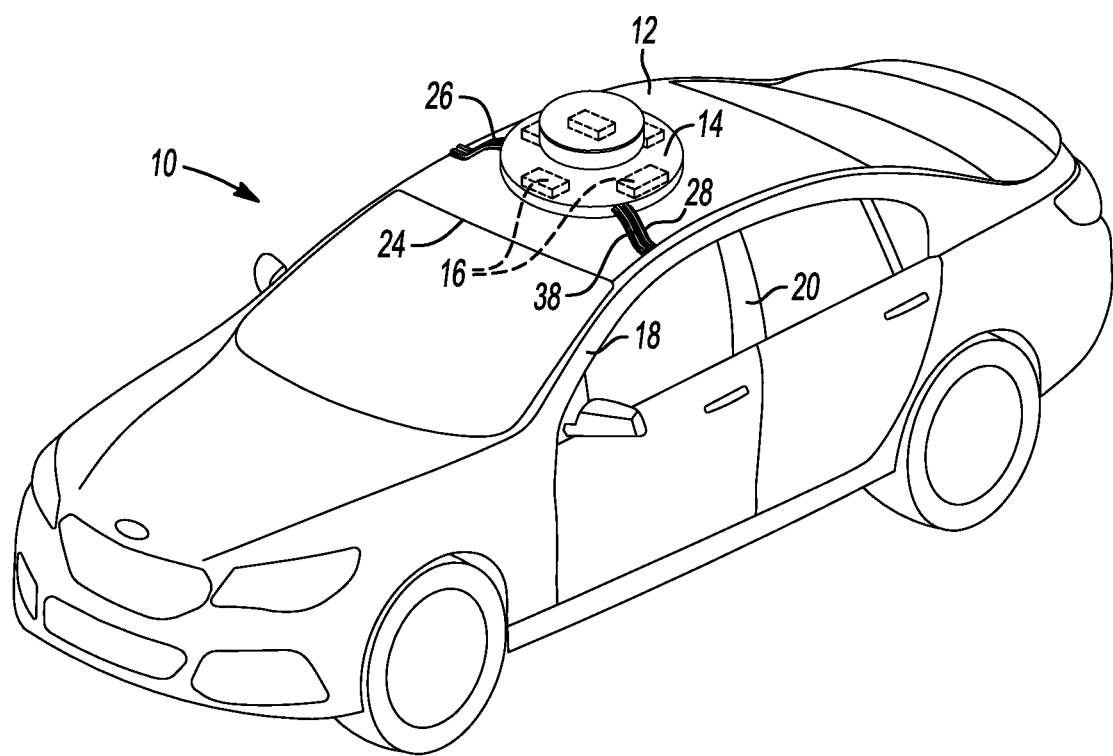
FIG. 1 is a front left side perspective view of an autonomous vehicle proved with a pod for electronic equipment required by the vehicle and bridge brackets connecting the pod to the roof rails of the vehicle.

Referring to FIG. 1, an autonomous vehicle 10 (hereinafter vehicle) is shown that includes a roof 12 with a pod 14, or enclosure, for electronic equipment 16 shown in phantom lines inside the pod 14. The roof 12 is supported by a plurality of pillars including an A-pillar 18 and a B-pillar 20. A roof bow 22 (shown in FIG. 3) extends laterally across the vehicle 10 and is connected to the top ends of the B-pillars 20. A windshield header 24 extends between and is connected to the top ends of A-pillars 18.

Figure 2:
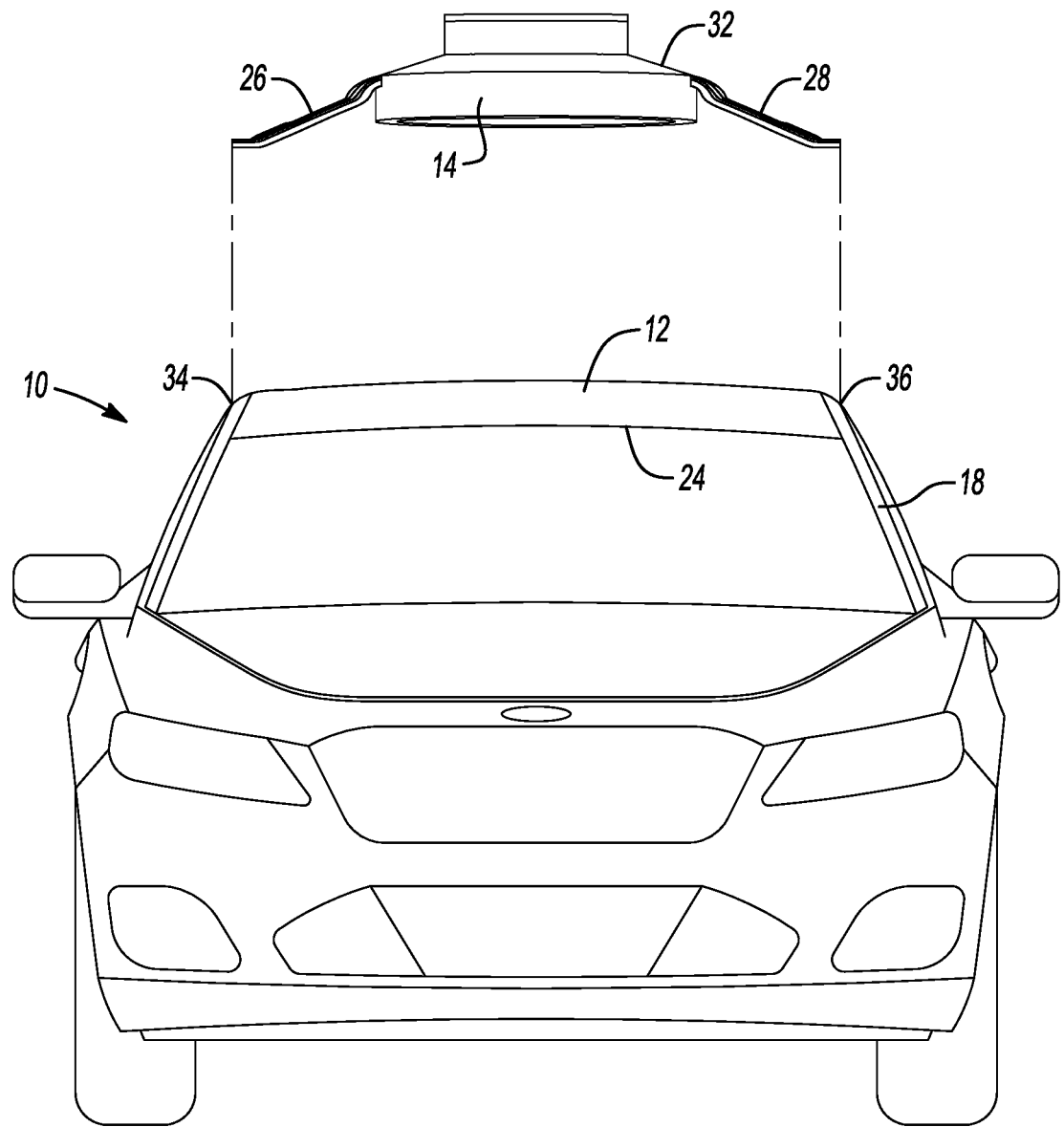
FIG. 2 is an exploded perspective view of the autonomous vehicle shown in FIG. 1 with the pod and bridge bracket sub-assembly separated from the vehicle.

Referring to FIGS. 1 and 2, a first bridge bracket 26 and a second bridge bracket 28 extend from the side 30 of the pod 14 below a shoulder 32 formed on the pod 14. The bridge brackets 26 and 28 include a plurality of parallel ribs 38 that together form a corrugated reinforcement. The bridge brackets 26 and 28 are generally aligned with the shoulder 32 and extend laterally and forwardly from the pod 14 to the right roof rail 34 and left roof rail 36. The angled (not parallel to the roof bow 22) orientation of the bridge brackets 26 and 28 adds strength and prevents "match-boxing" of the brackets 26 and 28 and pod 14 when subjected to a roof crush load. The bridge brackets 26 and 28 and the pod 14 form an arch shaped structure connected to the roof rails 34 and 36 that reduces the extent of displacement of the roof 12 toward the passenger compartment of the vehicle 10. The bridge brackets 26 and 28 and the pod 14 are assembled as a sub-assembly to the vehicle 10.

Figure 3:
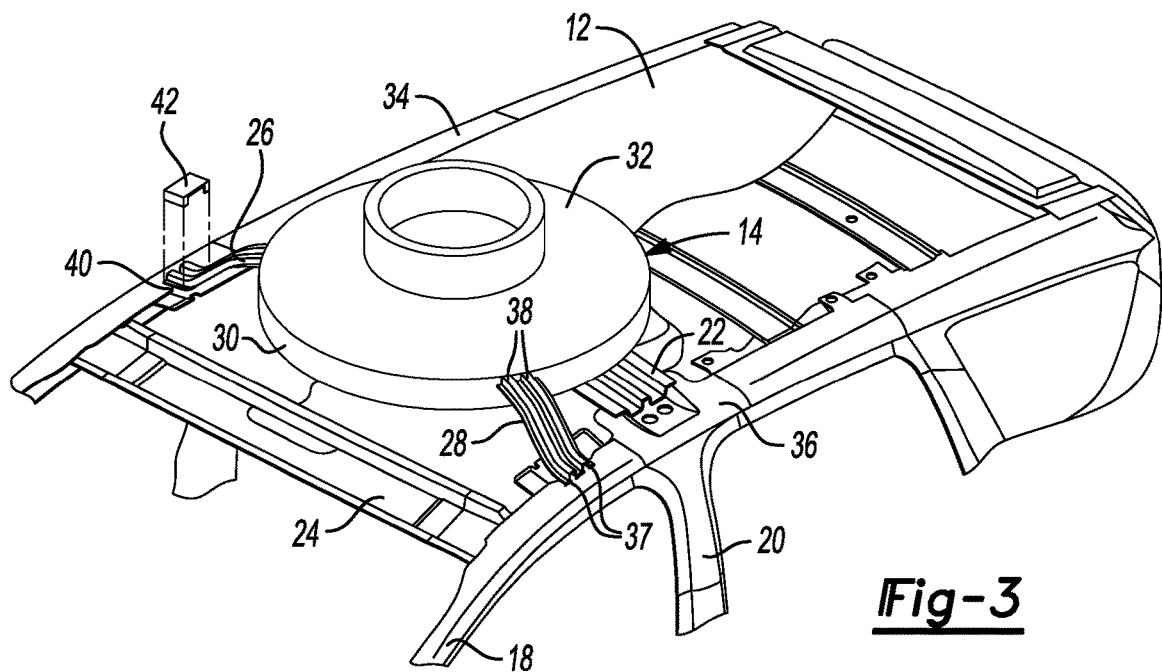
FIG. 3 is a fragmentary perspective view of the roof and the roof support structure with one side of the roof panel removed and one side with the roof panel in place and with the pod attached to the vehicle.
Figure 4:
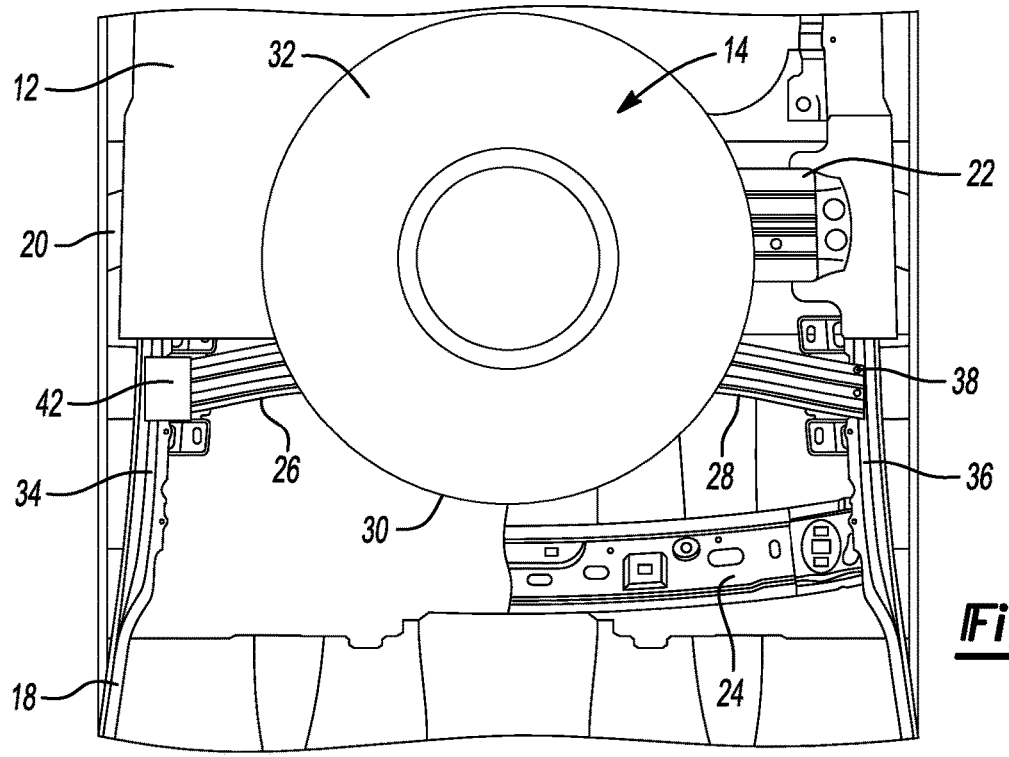
FIG. 4 is a fragmentary top plan view of the roof and the roof support structure with one side of the roof panel removed and one side with the roof panel in place and with the pod attached to the vehicle.

Referring to FIGS. 3 and 4, the roof 12 is shown with the left half of the roof 12 removed to illustrate the roof support structure. The roof support structure includes the A-pillars 18 and B-pillars 20. The A-pillars support the windshield header 24 and the B-pillars support the roof bow 22.

The first bridge bracket 26 and the second bridge bracket 28 cooperate with the roof bow 22 supported by the B-pillars to support the pod 14. The roof bow 22 is disposed below the pod 14 and the bottom of the pod 14 is supported through the roof 12 on the roof bow 22. The support provided by the roof bow 22 is combined with the support provided by the bridge brackets 26 and 28.

The bridge brackets 26 and 28 may be secured with welds 37 as shown in FIG. 3 or fasteners 38 as shown in FIG. 4 to the right and left roof rails 34 and 36, respectively. A pair of edge cut-outs 40 are defined on opposite sides of the roof to provide access for attachment of the brackets 26 and 28. A pair of cover pieces 42 are attached over the brackets 26 and 28 and the edge cut-outs 40 to complete assembly of the pod 14 and brackets 26 and 28 to the roof 12.

The method for providing an enclosure 14 for electronic components 16 on the roof 12 of an autonomous vehicle 10 includes the step of inserting first and second bridge brackets 26 and 28 into an injection molding die. The first and second bridge brackets 26 and 28 are formed of ultra-high strength steel (UHSS) and corrugated for greater strength. A molten thermoplastic material, for example a PA66 nylon matrix, is then injected into the injection molding die to form the enclosure 14 thereby attaching the first and second bridge brackets 26 and 28 to the enclosure. The enclosure 14 is then arranged on the roof 12, and the bridge brackets 26 and 28 are then attached to first and second roof rails by welds 37 or fasteners 38.

The method may further comprise forming edge cut-outs 40 in the roof, and assembling the cover pieces 42 over the cutouts 40 to cover first and second distal ends of the bridging brackets 26 and 28.

Figure 5:
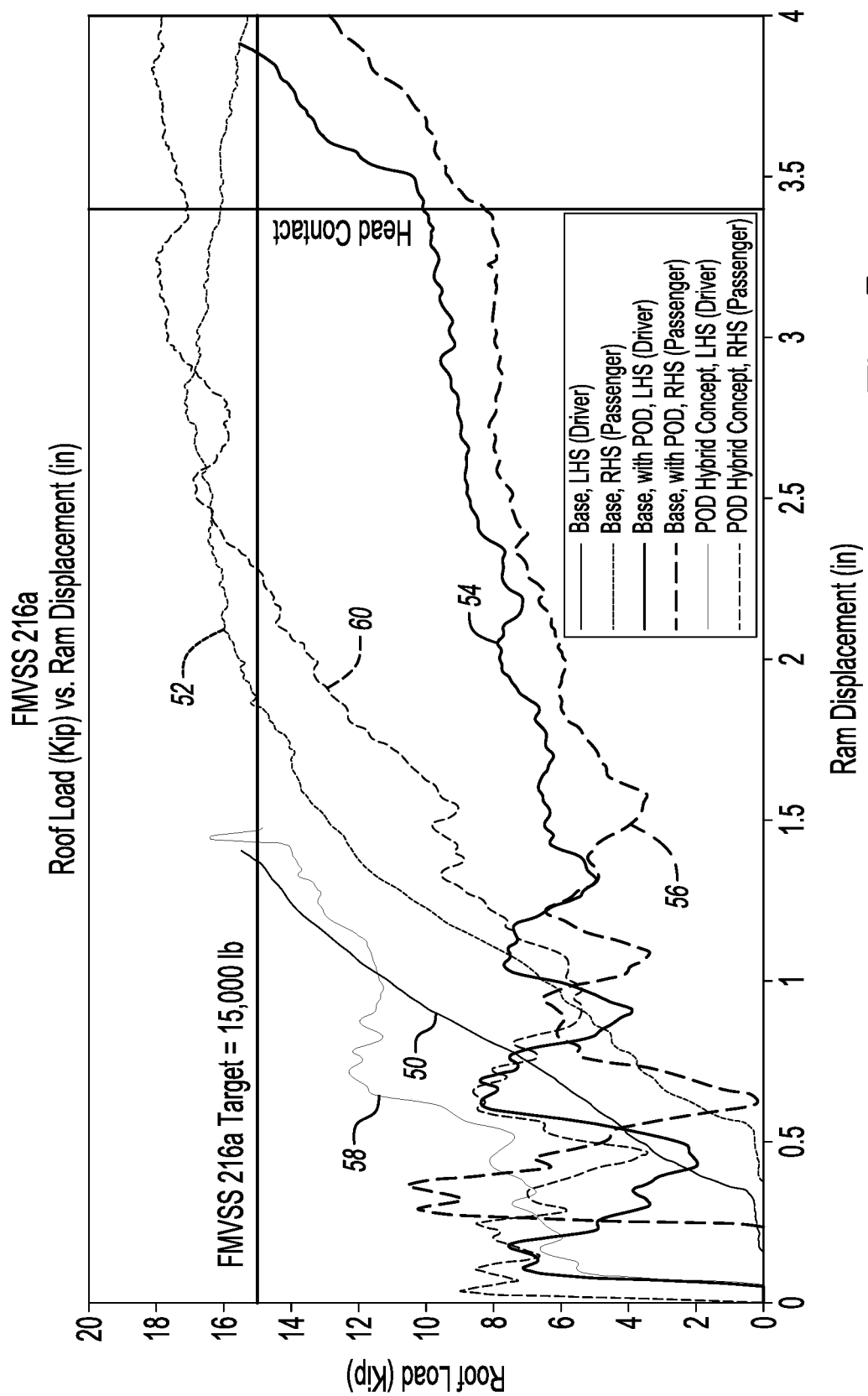
FIG. 5 is a graph of FMVSS 216a test results for three different roof configurations.

Referring to FIG. 5, a graph of FMVSS 216a test results as simulated for three different roof configurations is provided. Numeral 50 identifies a base test with no pod 14 assembled to the roof on the driver side test. Numeral 52 identifies a base test with no pod 14 assembled to the roof on the passenger side test. Numeral 54 identifies a comparative test with a pod assembled to the roof 12 on the driver side. Numeral 56 identifies a comparative test with a pod assembled to the roof 12 on the passenger side. Numeral 58 identifies a test of the disclosed embodiment with a pod 14 and bridge brackets 26 and 28 on the driver side. Numeral 60 identifies a test of the disclosed embodiment with a pod 14 and bridge brackets 26 and 28 on the passenger side.

The FMVSS 216a test requires withstanding a load of three times vehicle weight (15,000 lbs.) and a head resultant force less than 50 lbs. (less than 3.4 inches of displacement of the ram of the test apparatus) p. Lines 50 and 52 shows that the roof 12 without a pod 14 passes the test requirement in the FMVSS 216a test with approximately 1.3 and 1.8 inches of ram displacement on the driver's side and the passenger's side, respectively. Lines 54 and 56 shows that the roof with a pod 14 fails the test requirement of withstanding a 15,000-lb. load in the FMVSS 216a test with approximately 3.8 and more than 4 inches of ram displacement on the driver's side and the passenger's side, respectively. The disclosed embodiment including the pod 14 and bridge brackets 26 and 28 on the roof 12 passes the test requirement by withstanding a 15,000-lb. load in the FMVSS 216a test with approximately 1.3 and 2.3 inches of ram displacement on both the driver's side and the passenger's side, respectively.

The disclosed embodiment achieves the desired resistance to the roof crush load but adds only 2.6 Lbs. while an alternate approach would add between 3.7 and 4.4 Lbs. (the mass of an added windshield header 24 or a roof bow 22, respectively).

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An autonomous vehicle equipped with electronic devices comprising:
   a roof;
   a support structure including a roof bow and right and left roof rails for supporting the roof;
   an enclosure for the electronic devices assembled onto the roof and partially supported by the support structure; and
   first and second bridge brackets each extending between a shoulder surface of the enclosure and one of the roof rails on opposite sides of the roof, wherein the enclosure and the first and second bridge brackets are attached to the roof and roof rails as a sub-assembly with the bridge brackets being attached to the right and left roof rails.

2. The autonomous vehicle of claim 1 wherein the enclosure and the first and second bridge brackets form an arch over the roof forward of the roof bow, wherein the roof bow extends between a pair of B-pillars.

3. The autonomous vehicle of claim 1 wherein the roof defines first and second edge cutouts, wherein the first and second bridge brackets extend through the edge cutouts to be attached to the roof rails.

4. The autonomous vehicle of claim 3 wherein the first and second bridge brackets are secured by fasteners to the roof rails.

5. The autonomous vehicle of claim 3 wherein the first and second bridge brackets are welded to the roof rails.

6. The autonomous vehicle of claim 3 further comprising:
first and second cover pieces attached to the edge cutouts to seal against the roof about the first and second bridge brackets.

7. The autonomous vehicle of claim 1 wherein the first and second bridge brackets are formed of ultra-high strength steel.

8. The autonomous vehicle of claim 1 wherein the enclosure is formed of nylon.

9. The autonomous vehicle of claim 1 wherein the enclosure and the first and second bridge brackets are assembled together in an insert molding process and are attached to the roof and roof rails as a sub-assembly with the first and second bridge brackets being attached to the roof rails.

10. An enclosure assembly for electronic equipment for an autonomous vehicle, the assembly comprising:
an enclosure for the electronic equipment assembled onto a roof; and
first and second bridge brackets each extending between the enclosure and one of a right roof rail and a left roof rail to partially support the enclosure, wherein the enclosure is further supported by a roof bow extending between right and left roof rails on opposite sides of the roof, wherein the enclosure and the first and second bridge brackets are attached to the roof as a sub-assembly with the first and second bridge brackets being attached to the right and left roof rails.

11. The enclosure assembly of claim 10 wherein the enclosure and the first and second bridge brackets form an arch over the roof forward of the roof bow.

12. The enclosure assembly of claim 10 wherein the roof defines first and second edge cutouts, wherein the first and second bridge brackets extend through the edge cutouts to be attached to the roof rails.

13. The enclosure assembly of claim 12 further comprising:
first and second cover pieces attached to the edge cutouts to seal against the roof about the first and second bridge brackets.

14. The enclosure assembly of claim 10 wherein the enclosure and the first and second bridge brackets are assembled together in an insert mold forming process and are attached to the roof and roof rails as a sub-assembly with the first and second bridge brackets being attached to the roof rails.

15. A method of providing an enclosure for electronic components on a roof of an autonomous vehicle comprising:
inserting first and second bridge brackets into an injection molding die;
injecting a thermoplastic material into the injection molding die to form the enclosure and attach the first and second bridge brackets to the enclosure;
arranging the enclosure onto the roof; and
attaching the bridge brackets to first and second roof rails.

16. The method of claim 15 further comprising:
providing cover caps;
forming edge cutouts in the roof; and
assembling the cover caps into the cutouts to cover first and second distal ends of the bridge brackets.

* * * * *